(12) United States Patent
Ju et al.

(10) Patent No.: US 8,589,157 B2
(45) Date of Patent: Nov. 19, 2013

(54) REPLYING TO TEXT MESSAGES VIA AUTOMATED VOICE SEARCH TECHNIQUES

(75) Inventors: Yun-Cheng Ju, Bellevue, WA (US); Ye-Yi Wang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1052 days.

(21) Appl. No.: 12/329,406

(22) Filed: Dec. 5, 2008

(65) Prior Publication Data

US 2010/0145694 A1 Jun. 10, 2010

(51) Int. Cl.
*G10L 15/26* (2006.01)
(52) U.S. Cl.
USPC .......................................................... 704/235
(58) Field of Classification Search
USPC .......................................................... 704/235
See application file for complete search history.

(56) References Cited

U.S. PATENT DOCUMENTS

| | | | |
|---|---|---|---|
| 7,016,845 B2 | 3/2006 | Vora | |
| 7,092,888 B1 * | 8/2006 | McCarthy et al. | 704/277 |
| 7,280,966 B2 | 10/2007 | Ju | |
| 7,720,682 B2 * | 5/2010 | Stephanick et al. | 704/252 |
| 7,778,837 B2 * | 8/2010 | Thiesson et al. | 704/278 |
| 7,881,936 B2 * | 2/2011 | Longe et al. | 704/257 |
| 2006/0036438 A1 | 2/2006 | Chang | |
| 2007/0005570 A1 | 1/2007 | Hurst-Hiller | |
| 2007/0042812 A1 | 2/2007 | Basir | |
| 2007/0207821 A1 | 9/2007 | Tran | |
| 2008/0133230 A1 | 6/2008 | Herforth | |
| 2008/0153465 A1 | 6/2008 | Evermann | |
| 2008/0221898 A1 | 9/2008 | Cerra | |

OTHER PUBLICATIONS

Elinor Mills, "Message Sling offers voice-to-text message service". Webware, Sep., 2008, 1 page.
Unkmown Author, "Pinger: text messaging with your voice" PopGadget, Sep. 2007, 3 pages.

(Continued)

*Primary Examiner* — Susan McFadden
(74) *Attorney, Agent, or Firm* — Lyon & Harr, LLP; Mark A. Watson

(57) ABSTRACT

An automated "Voice Search Message Service" provides a voice-based user interface for generating text messages from an arbitrary speech input. Specifically, the Voice Search Message Service provides a voice-search information retrieval process that evaluates user speech inputs to select one or more probabilistic matches from a database of pre-defined or user-defined text messages. These probabilistic matches are also optionally sorted in terms of relevancy. A single text message from the probabilistic matches is then selected and automatically transmitted to one or more intended recipients. Optionally, one or more of the probabilistic matches are presented to the user for confirmation or selection prior to transmission. Correction or recovery of speech recognition errors avoided since the probabilistic matches are intended to paraphrase the user speech input rather than exactly reproduce that speech, though exact matches are possible. Consequently, potential distractions to the user are significantly reduced relative to conventional speech recognition techniques.

20 Claims, 4 Drawing Sheets

(56) References Cited

OTHER PUBLICATIONS

Wang, et al., "Confidence Measures for Voice Search Applications", Interspeech 2007, ISCA, Antwerp, Belgium, 2007, pp. 2721-2724.

Franz, et al., "Searching the Web by Voice", in Proc. Coling, 2002, 5 Pages.

Wang, et al., "An Introduction of Voice Search," in IEEE Signal Processing Magazine, vol. 25, No. 3, May 2008.

Gilbert, et al., "Intelligent Virtual Agents for Contact Center Automation" in IEEE Signal Processing Magazine, vol. 22, No. 5, Sep 2005.

Yun-Cheng Ju, and Julian Odell, "A Language-Modeling Approach to Inverse Text Normalization and Data Cleanup for Multimodal Voice Search Applications," in InterSpeech, 2008.

* cited by examiner

REPLYING TO TEXT MESSAGES VIA AUTOMATED VOICE SEARCH TECHNIQUES

BACKGROUND

1. Technical Field

A "Voice Search Message Service" provides various techniques for sending or responding to text messages based on a user speech input, and in particular, various techniques for selecting one or more pre-defined probabilistic responses that most closely match an arbitrary user speech input, and then automatically sending one of those responses as a text message.

2. Related Art

Voice search is a technology underlying many spoken dialog systems (SDSs) that provide users with the information they request via a spoken query. The information normally exists in a large database, and the spoken query is compared with a field in the database to obtain the relevant information. The contents of the field, such as business or product names, are often unstructured text. For example, directory assistance is a popular voice search application in which users issue a spoken query and an automated system returns the phone number and/or address information of a business or an individual. Other voice search applications include music/video management, business and product reviews, stock price quotes, and conference information systems.

In general, typical voice search systems operate by attempting to first recognize a user's utterance with an automatic speech recognizer (ASR) that utilizes an acoustic model, a pronunciation model, and language model. The m-best results returned by the ASR are then passed to a search component to obtain the n-best semantic interpretations; i.e., a list of up to n entries in the database. The interpretations are then passed to a dialog manager that uses confidence measures, which indicate the certainty of the interpretations, to decide how to present the n-best results. If the system has high confidence on a few entries, it directly presents them to the user. Otherwise, these types of voice search systems generally interact with the user to understand what he actually needs, or to correct any speech recognition errors.

Unfortunately, one of the limitations of these types of speech enabled applications is the need for accurate speech recognition. For example, if the user speaks the name "Sean Jones" and the system recognizes that name as "John Jones", the system will return incorrect information from the database. In other words, speech enabled applications generally require accurate speech recognition in order to provide accurate results or responses. Further, it is well known that speech recognition accuracy increases in proportion to the available computing power, and decreases in response to rising noise levels. Consequently, typical speech enabled applications are not well suited where computing power is limited (such as the computing power within a typical mobile phone or the like) or in a noisy environment, such as in a car while driving on the highway.

Some of the problems of accurate speech recognition can be alleviated in "voice command" type systems where the user is limited to speaking only a set of predefined commands or words (e.g. "one", "two", "three", "stop", "start", "skip", etc.) by using a strict context free grammar (CFG) based language model or the like. In this case, the system is less likely to return an error in speech recognition since the possible set of acceptable values (i.e., particular speech utterances) is severely constrained relative to natural spoken language. Unfortunately, in the case of voice command type applications, it is not practical for the user to remember exactly what to say, as demanded by the current technology "voice command", especially when the list of specific voice commands grows beyond a few simple entries. Consequently, the utility of such systems is limited with respect to applications such as text messaging, where the user may use arbitrarily speech to respond to an arbitrary text message.

Text messages generally include short message service (SMS) type text messages or other text messages transmitted by the user from a mobile phone or other portable or mobile communications devices. Sending or replying to text messages on mobile devices, especially while driving, is a challenging problem for a number of reasons. In fact, in many locations, such as California for example, it is illegal for a driver to type text messages while driving. Further, even with the help of speech recognition, there is no known practical yet safe user interface that can recover speech recognition mistakes without dangerously distracting the driver. Consequently, speech recognition for use in dictating specific text messages is not generally practical in such environments.

For example, in the case of speech enabled applications that require accurate recognition of speech dictation by the user, typical dictation style speech correction user interfaces are simply too demanding of user attention, and thus too dangerous to be considered while the user is driving or piloting a vehicle. In particular, typical user interfaces for correction of speech recognition errors generally require the user to either repeat particular words or phrases until those words or phrases are eventually correctly recognized, or to interact with a user interface, such as display device, to manually select or input text corresponding to the corrected speech dictation of the user. In either case, this type of speech correction user interface is simply too demanding of user attention to be considered safe when any distraction to the user could pose a danger to the user or to others.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A "Voice Search Message Service" as described herein, provides various techniques for sending or responding to text messages by selecting a text message for transmission from a set or database of pre-defined or user defined text messages (also referred to herein as a "text message database"). Further, in contrast to conventional voice command type applications where the user is required to remember exactly what to say relative to a pre-defined list of specific voice commands, the Voice Search Message Service operates in response to an arbitrary speech utterance by the user. The Voice Search Message Service converts the speech input of the user into text using an automatically trained statistical language model (SLM), and then automatically selects a text message that probabilistically paraphrases the recognized text from the text message.

Note that the SLM is specifically trained on collections of text messages to improve robustness in speech recognition relative to real-world text messages. Further, the text message database from which messages are selected for transmission is populated from the collection of text messages used for training. Further, it is important to note that selection of the text messages from the text message database is accomplished without the need to precisely identify or correct all words spoken by the user.

More specifically, the Voice Search Message Service provides a voice-search based information retrieval process that evaluates a user speech input. The Voice Search Message Service then returns one or more speech recognition hypotheses, i.e., a set of n-best probabilistic recognitions of the speech input, and then uses these n-bests to identify one or more probabilistic matches from the text message database. Note that the number n of the n-best probabilistic recognition hypotheses of the user speech input is limited either by fixing the value of n at some desired value (e.g., three most likely phrases spoken by the user), or by limiting n as a function of a minimum acceptable probability or confidence associated with each of the n-best speech recognition hypotheses.

The Voice Search Message Service then uses the information retrieval technique to select a single one of the probabilistic matches to the n-best speech recognition hypotheses from the text message database that most closely paraphrases the user speech. In other words, given several possible interpretations or transcriptions of the user speech input (i.e., the set of n-bests), the Voice Search Message Service identifies and ranks a set of text messages from the text message database in order of a probabilistic "confidence score" which describes a probability of how well each of the corresponding speech recognition hypotheses correspond to the user speech input. As discussed in further detail below, in various embodiments, these probabilistic matches are also automatically sorted in terms of relevancy prior to final selection for transmission. In other words, each of the n-bests has a probabilistic "confidence score" of match to the user speech input. Conversely, a "relevancy score" represents a probability of match between a particular speech recognition hypothesis and a particular entry in the text message database. Therefore, each probabilistic match can be understood to have both a "confidence score" and a "relevancy score."

For example, a match from the text message database may have a lower confidence score for the corresponding speech recognition hypotheses, but a higher relevancy score than another match from the text message database. In this case, depending upon the actual confidence scores and relevancy scores, the Voice Search Message Service may select the more relevant text message even though the corresponding speech recognition hypothesis has a lower confidence score (e.g., the speech recognition hypothesis is less likely to match the user speech input). In related embodiments, one or more of the probabilistic matches, optionally sorted in order of relevancy, are presented to the user for confirmation or selection prior to transmission.

The following simple example provides a general operational illustration of the Voice Search Message Service following training of the SLM. In particular, assume that the user wants to respond to an incoming text message which is simply "Lunch?" The Voice Search Message Service will present this message to the user either as a text message on a display screen or heads-up display, or will use conventional text-to-speech techniques to speak the message to the user. In response, assume that the user provides a speech input of: "No, I can't have lunch today, how about next week?" In general, it is expected that this speech may be recognized with one or more errors, especially in a noisy environment such as a moving car.

For example, assume that the Voice Search Message Service recognizes the user's speech as "No I can get lunch today out of next week" (with no additional n-best speech recognition hypotheses in this particular example). Clearly, the recognized speech has a number of errors relative to the original spoken speech. However, in this example, the Voice Search Message Service will select a text message from the database that probabilistically matches the recognized text, which in this case will be "Not today, next week." Note that while the selected message is clearly not what the user spoke, it does accurately paraphrase the speech of the user in a manner that is sufficient for text messaging purposes.

There are several advantages to the fuzzy matching techniques described above. For example, even with a significant amount of speech recognition errors, the Voice Search Message Service is capable of selecting text messages that are intended to generally paraphrase the user speech input rather than exactly reproduce that input. Consequently, distractions to the user are limited by avoiding the need to have the user closely monitor or correct errors in the speech recognition process. This is especially important in situations where the user is driving or piloting a moving vehicle (cars, airplanes, trains, etc.), such that distractions to the user can be dangerous. Further, both computational overhead and potential distractions to user attention are significantly reduced relative to conventional speech recognition techniques since the probabilistic matching techniques described herein do not require perfect speech recognition, or even correction or recovery of any resulting speech recognition errors.

In view of the above summary, it is clear that the Voice Search Message Service described herein provides various techniques for using arbitrary speech inputs to drive automated text messaging from a database of pre-defined text messages. In addition to the just described benefits, other advantages of the Voice Search Message Service will become apparent from the detailed description that follows hereinafter when taken in conjunction with the accompanying drawing figures.

DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction

In general, a "Voice Search Message Service," as described herein, provides various techniques for generating text messages from a user speech input. In particular, the Voice Search Message Service provides a voice-search based information retrieval process that evaluates the user speech input and selects one or more probabilistic matches from a set or database of pre-defined or user-defined text messages. These text messages are intended to generally paraphrase the user speech input rather than exactly dictate the speech input, though exact matches are possible assuming that the database of pre-defined text messages includes an exact match to a particular user speech input. These probabilistic matches are also optionally sorted in terms of relevancy. The Voice Search Message Service then automatically selects a single one of these probabilistic matches. However, in various embodiments, one or more of the probabilistic matches are first presented to the user for confirmation or selection. In either case, the selected text message is then automatically transmitted to one or more intended recipients.

1.1 System Overview

As noted above, the "Voice Search Message Service," provides various techniques for using arbitrary speech inputs to select and transmit a text message from a database of pre-defined text messages such that the selected text message generally paraphrases the user speech input. The processes summarized above are illustrated by the general system diagram of FIG. 1. In particular, the system diagram of FIG. 1 illustrates the interrelationships between program modules for implementing various embodiments of the Voice Search Message Service, as described herein.

Figure 1:
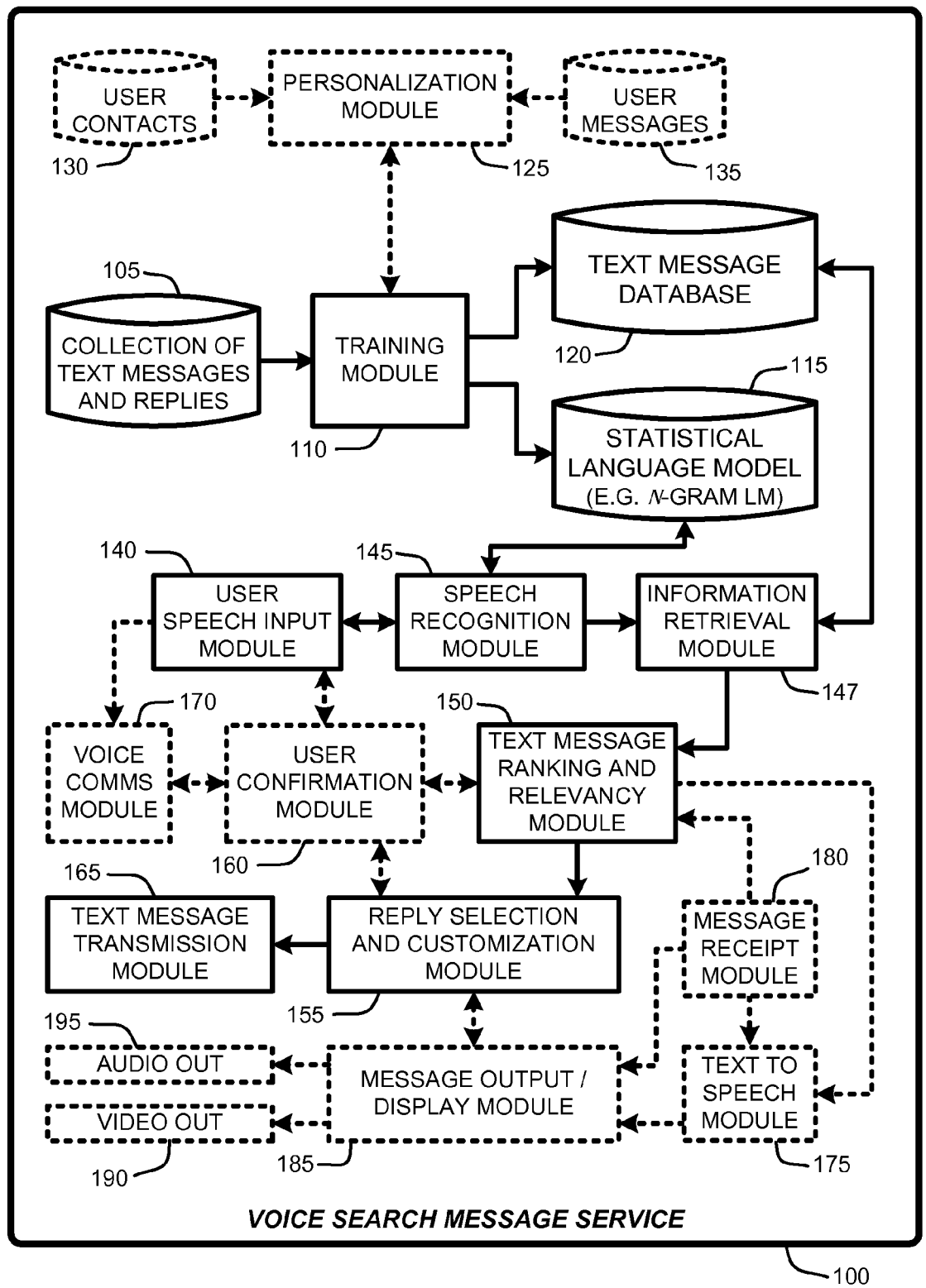
FIG. 1 provides an exemplary architectural flow diagram that illustrates program modules for implementing various embodiments of the Voice Search Message Service, as described herein.

Furthermore, while the system diagram of FIG. 1 illustrates a high-level view of various embodiments of the Voice Search Message Service, FIG. 1 is not intended to provide an exhaustive or complete illustration of every possible embodiment of the Voice Search Message Service as described throughout this document. In addition, it should be noted that any boxes and interconnections between boxes that may be represented by broken or dashed lines in FIG. 1 represent alternate embodiments of the Voice Search Message Service described herein, and that any or all of these alternate embodiments, as described below, may be used in combination with other alternate embodiments that are described throughout this document.

In general, as illustrated by FIG. 1, the processes enabled by the Voice Search Message Service 100 begin operation by receiving a database or collection of text messages and replies 105 for language model training. This collection of text messages and replies 105 represents a real-world collection of text messages that can be populated in a number of ways, as discussed in further detail in Section 2.2 with respect to FIG. 2. However, regardless of how the collection of text messages and replies 105 is populated, the contents of that database are provided to a training module 110 for use in learning or training a statistical language model (SLM).

In particular, the training module 110 processes the contents of the collection of text messages and replies 105 uses this information to learn or construct a statistical language model 115 such as, for example, an N-gram based semantic language model, and a collection of possible replies that represents a text message database 120 from which text messages are selected for transmission by the Voice Search Message Service 100 as described herein.

It should be understood that when available, message chains (i.e., chains of two or more text messages and corresponding responses) are used by the training module 110 to learn probabilistic relationships between messages in the statistical language model 115 and the text message database 120. Therefore, as discussed in further detail below, when using voice search techniques to select messages from the text message database 120, if the user is responding to an incoming text message, the Voice Search Message Service 100 will guide the selection of potential text message responses based, in part, on the relevancy of the actual text of the incoming message to the user speech input used for selecting a text message from the text message database 120.

Note that the text message database 120 can include all of the text messages in the collection of text messages and replies 105 that is used for training. However, given a sufficiently large collection of text messages and replies 105, it has been observed that many text messages repeat two or more times. Further, it has also been observed that many text messages are very similar. Therefore, in various embodiments, the training module prunes the collection of text messages and replies 105 when constructing the text message database 120 by selecting only messages that are observed at least some predetermined number of times (e.g., two or more times) in order to improve the quality of the collection by only including relatively popular replies.

Further, in one embodiment, when constructing the statistical language model 115 and the text message database 120 from user responses to known questions or messages, each of the responses to each particular question are clustered, and a subset of some or all of those clustered responses are selected by the training module 110 for use in populating the text message database 120. See Section 2.2 for additional discussion regarding clustering.

Note that training of the statistical language model 115 and construction of the text message database 120 is generally done offline and provided to the end user as a fixed component of the overall Voice Search Message Service 100. However, in various embodiments, the user is provided with the capability to customize the text message database 120 and the statistical language model 115 based on personal preferences and individual text messaging styles. Additional customization of the text message database 120 and the statistical language model 115 is also achieved in various embodiments by automatically parsing the user's contact list 130 and prior text messages 135 to provide additional input to the training module 110. For example, in various embodiments, a personalization module 125 reads the contents of either or both the user's contacts 130, and user text messages 135. This information is then provided to the training module 110 for use in constructing the statistical language model 115 and the text message database 120.

Further, by parsing the contents of the end user's contacts 130 and text messages 135, the training module 110 can incorporate personal names, stored phone numbers, addresses, etc., in the statistical language model 115 and the text message database 120. In addition, this parsing also allows the personalization module to include previously sent or received text messages from the user's text messages 135 in the text message database 120.

As discussed in further detail in Section 2.5, one or more of the text messages in the text message database 120 include one or more slots or variables that are automatically populated based on the user's speech input. Such slots include one or more placeholders for variables such as specific times, dates, names, numbers, phone numbers, addresses, etc. For example, a particular text message may include slots or variables, such as "<name> phone number is <number>", where "<name>" and "<number>" are variables in a "template" type text message. Note that the user can also enter custom text messages, including template type text messages, via the personalization module 125 for inclusion in the text message database 120.

A simple example of this idea is that the user may want to respond to an incoming SMS such as "when are you going to be back?". In this case, the user may respond with the speech input "See you in about 10 minutes." Assuming that the text message database 120 includes a template type message having a slot or variable for time, e.g., "In <number> minutes", then the Voice Search Message Service will select the text message "In 10 minutes" in response to the user speech input. Note that the template type message in the preceding example is automatically generated from an original text message that includes some arbitrary time, such as "in 35 minutes". In this case, the training module 110 recognizes the number "35" in the original text message and replaces that number with a corresponding variable, e.g., "<number>" to construct the template type message of "in <number> minutes." Another simple example of generating a template type message with respect to dates is to construct a template type message such as "I'm leaving on <date>" from the original text message "I'm leaving on January 25th".

As noted above, names from the user's contact list can also be used to train the statistical language model 115. These names can then be recognized in the user speech input using either the statistical language model 115, or a context free grammar (CFG) model associated with the statistical language model. For example, assuming that that the user may want to send a text message such as "Call Jenny's number." In this case, if "Jenny" is in the user's contact list 130, the training module can construct messages for inclusion in the text message database 120 such as "Jenny's phone number is (555) 555-0199" by using a text message having slots or variables, such as "<name> phone number is <number>", where "<name>" and "<number>" are variables in a "template" type text message, as described in further detail in Section 2.5.

It should also be noted that the contents of the collection of text messages and replies 105 can be used for localization purposes. In particular, different data sets representing the collection of text messages and replies 105 can be provided for different regions, different countries, different languages, or even different texting styles (e.g., use of traditional words in text messages vs. use of acronyms such as "TTYL" to represent "talk to you later"). Consequently, when the statistical language model 115 and the text message database 120 are constructed by the training module 110, they will reflect the region, language and texting style of the data used for training. Consequently, in various embodiments, the user is provided with the capability to select from a list of available languages, dialects, and/or texting styles for use by the Voice Search Message Service 100, depending upon which different training sets (i.e., separate collections of text messages and replies 105) were used for training.

Once the statistical language model 115 and the text message database 120 have been constructed by the training module 110, the Voice Search Message Service 100 is ready to automatically select text messages in response to a user speech input. In particular, a user speech input module 140 is used to capture a user speech input via a conventional microphone or microphone array (not shown in FIG. 1) that is coupled to the Voice Search Message Service 100. The speech input captured by the user speech input module 140 is passed to a speech recognition module 145 (also referred to herein as a "speech recognizer") that attempts to recognize the speech of the user and convert that speech to a text input with the assistance of a conventional acoustic model (not shown in FIG. 1) such as is used with conventional speech recognizers. Note also that the acoustic model will correspond to the localization of the statistical language model 115. For example, a statistical language model 115 intended for use in France will use a French language based acoustic model, while a statistical language model 115 intended for use in India will use an Indian language based acoustic model.

Note that in various embodiments, the speech recognition module 145 (with corresponding acoustic model) is further adapted (i.e., customized) on a per-user basis to more accurately recognize the speech input of each particular user. In this case, the user will generally be asked to speak a particular word or series of words or sentences so that the speech recognition module 145 can be trained on the speech characteristics of the particular user. Note that these types of speech recognition training techniques for adapting speech recognition algorithms to particular users is well known to those skilled in the art, and will not be described in detail herein.

In general, when recognizing the speech of the user, the speech recognition module 145 will return a set of one or more speech recognition hypotheses, i.e., a set of n-best probabilistic recognitions of the speech input. Note that the number n of the n-best probabilistic recognition hypotheses of the user speech input is limited either by fixing the value of n at some desired value (e.g., three most likely phrases spoken by the user), or by limiting n as a function of a minimum acceptable probability or confidence associated with each of the n-best speech recognition hypotheses.

In other words, the Voice Search Message Service 100 evaluates the user speech input, relative to the statistical language model 115, to generate a set of text inputs corresponding to each of the n-best speech recognition hypotheses. More specifically, as discussed in further detail below in Sections 2.3 through 2.4, the speech recognition module 145 uses the statistical language model 115 to guide the speech recognition through a language space populated by the individual words in the text message database 120 to return one or more speech recognition hypotheses (i.e., the set of the n-bests). In other words, a lexicon of words available to the statistical language model 115 is defined by the contents of the text message database 120. This set of n-bests are then passed to an information retrieval module 147.

In general, the information retrieval module 147 uses informational retrieval or content search techniques to identify one or more text messages from the text message database 120 as probabilistic matches to the set of n-best speech recognition hypotheses generated in response to the user speech input. These identified probabilistic matches are then passed to a text message ranking and relevancy module 150 that ranks the probabilistically matching text messages in order of a "confidence score" that describes how well (in a probabilistic sense) that the corresponding speech recognition hypothesis probabilistically describes the user speech input. In other words, given several possible transcriptions of the user speech input (i.e., the set of n-bests), the text message ranking and relevancy module 150 ranks the set of text messages identified from the text message database 120 by the information retrieval module 147 in order of how well the corresponding n-bests describe the user speech input (e.g., in order of the confidence score associated with each of these messages).

As discussed in further detail below, in various embodiments, the text message ranking and relevancy module 150 also computes a "relevancy score" for each of the identified probabilistic matches (see Sections 2.4.1 and 2.4.2 for additional discussion of relevancy rankings or "relevancy scores". In general, a "relevancy score" represents a probability of match between a particular speech recognition hypothesis and a particular entry in the text message database. In various embodiments, the relevancy score is computed based on a term frequency/inverse document frequency (TF/IDF) process used in a weighted vector space model. However, in related embodiments, the relevancy score is computed using probabilities returned from other informational retrieval or content search techniques that probabilistically identify one or more text messages from the text message database 120 as probabilistic matches to particular speech recognition hypotheses.

In either case, each of the probabilistic matches identified by the information retrieval module can be understood to have both a "confidence score" and a "relevancy score", with sorting of these probabilistic matches being based on either the confidence score or the relevancy score in various embodiments. In various embodiments, the identified probabilistic matches are automatically sorted or re-ranked in terms of relevancy prior to final selection for transmission, For example, a match from the text message database 120 may have a lower confidence score for the corresponding speech recognition hypotheses, but a higher relevancy score than another match from the text message database. In this case, depending upon the actual confidence scores and relevancy scores, the Voice Search Message Service may select the more relevant text message even though the corresponding speech recognition hypothesis has a lower confidence score (e.g., the speech recognition hypothesis is less likely to match the user speech input).

Note that as discussed in further detail in Section 2.4, the identified probabilistic matches are not intended to exactly match the speech input of the user. In particular, the text messages corresponding to the identified probabilistic matches are only intended to generally paraphrase the user speech input. Therefore, even with a significant amount of speech recognition errors, the information retrieval module 147 identifies one or more text messages from the text message database 120 that probabilistically paraphrase the user speech input based on the available contents of the text message database 120.

Once the information retrieval module 147 has identified one or more text messages from the text message database 120, and those identified text messages have been ranked or sorted in terms of confidence score and/or relevancy score, those text messages are passed to a reply selection and customization module 155. In general, the reply selection and customization module 155 will select a single text message from the ranked text messages for transmission to one or more intended recipients via a text message transmission module 165 that uses conventional text messaging techniques to send the text message to one or more intended recipients.

Further, in various embodiments, a user confirmation module 160 allows the user to select or confirm a specific text message from those suggested by the reply selection and customization module 155 rather than allowing the reply selection and customization module 155 to automatically select a single text message for transmission. In this case, one or more of the highest ranked text messages (i.e., the matches that probabilistically paraphrase the user speech input) are presented to the user. The user then selects the desired text message via the user confirmation module 160.

In various embodiments, these suggested text messages are presented to the user via a message output/display module 185 either as a video text output using a video output device 190 (e.g., display device, heads-up display, etc.), or as a speech output using an audio output device 195 (e.g., speaker system or other audio output device). In the case of a speech output, a text to speech module 175 uses conventional text-to-speech techniques to generate a speech output from each of the ranked text messages that are presented to the user for selection via the user confirmation module.

Note that in addition to selecting the text message for transmission (either automatically, or via the user confirmation module 140), in various embodiments, the reply selection and customization module 155 also customizes the selected text message (prior to transmission or presentation to the user for selection) to fill one or more slots or variables in the selected message. In particular, as discussed in further detail in Section 2.5, one or more of the text messages in the text message database 120 have one or more slots or variables that are automatically populated based on the user's speech input. For example, such slots may include a placeholder for a specific time, date, name, phone number, address, etc.

A simple example of this concept is that the text message database 120 may include a pre-defined text message (also referred to herein as a "template") with a placeholder for a time, e.g., "Meet me at <time> today". This message may be the closest probabilistic match to a user speech input of such as "Let's meet today at 3:00". In this simple example, the Voice Search Message Service will automatically generate and send the message "Meet me at 3:00 today."

In addition, as noted above, in various embodiments, chains of messages and corresponding responses (from the collection of text messages and replies 105) are used by the training module 110 to learn probabilistic relationships between messages in the statistical language model 115 and the text message database 120. Note that this process can include information as to whether the incoming text message is a question, or a response to a question. Therefore, in various embodiments, when the user is responding to an incoming text message, the text message ranking and relevancy module 150 considers the contents of incoming text messages received by a message receipt module 180 when determining the relevancy score of text messages or ranking text messages identified from the text message database 120.

In additional embodiments, incoming text messages received by the message receipt module 180 are presented to the user via the message output/display module 185 in a similar manner as described above with respect to presenting suggested text messages to the user. In particular, incoming text messages are presented to the user either as a video text output using the video output device 190 (e.g., display device, heads-up display device, etc.), or as a speech output using the audio output device 195 (e.g., speaker system or other audio output device). In the case of a speech output, the text to speech module 175 uses conventional text-to-speech techniques to generate a speech output from the incoming text message.

Finally, in the case that the user wants to place a telephone call or voice communication rather respond with a text message, the Voice Search Message Service 100 provides a voice communications module 170 that allows the user to place a voice call (e.g., a hands-free phone call) using conventional mobile communications techniques. In this case, the user is provided with the capability to initiate telephone phone calls or other voice communications via the user speech input module 140, either by reciting a phone number or contact name to be dialed, or by directing the Voice Search Message Service 100 to respond with a telephone call or voice communication to an incoming text message received by the message receipt module 180. Similarly, in various embodiments, a touch-screen or keypad is also provided to the user to allow manual dialing of particular phone numbers.

2.0 Operational Details of the Voice Search Message Service

The above-described program modules are employed for implementing various embodiments of the Voice Search Message Service. As summarized above, the Voice Search Message Service provides various techniques for using arbitrary speech inputs to automatically select and transmit a text message from a database of pre-defined text message such that the selected text message generally paraphrases the user speech input.

The following sections provide a detailed discussion of the operation of various embodiments of the Voice Search Message Service, and of exemplary methods for implementing the program modules described in Section 1 with respect to FIG. 1. In particular, the following sections examples and operational details of various embodiments of the Voice Search Message Service, including: an operational overview of the Voice Search Message Service; initial collection of text messages for training; learning the language model and text message reply set; voice search guided speech recognition; text messages with variables or slots; and additional embodiments and considerations.

2.1 Operational Overview

As noted above, the Voice Search Message Service-based processes described herein, provides various techniques for using arbitrary speech inputs to drive automated text messaging from a database of pre-defined text messages. In general, the statistical language model is trained on a collection of real-world text messages and text message chains, and database text messages is populated from that same real-world collection of text messages and text message chains. This training and population of the text message database enables a message selection process that selects text messages intended to generally paraphrases a user speech input rather than exactly reproduce that speech input as a text message. A single text message, selected in response to the user speech input is then automatically transmitted to one or more intended recipients.

2.2 Initial Collection of Text Messages for Training

In general, the initial population of the collection of text messages and replies for training purposes does not need to be repeated once that database is initially created and populated. Therefore, in operation of the Voice Search Message Service 100, the collection of text messages and replies 105 will typically be provided for offline training, as described in further detail below, with the resulting language model and text message database then being provided to the end-user of the Voice Search Message Service. However, as noted above, the language model can be further customized or trained on a per-user basis.

Figure 2:
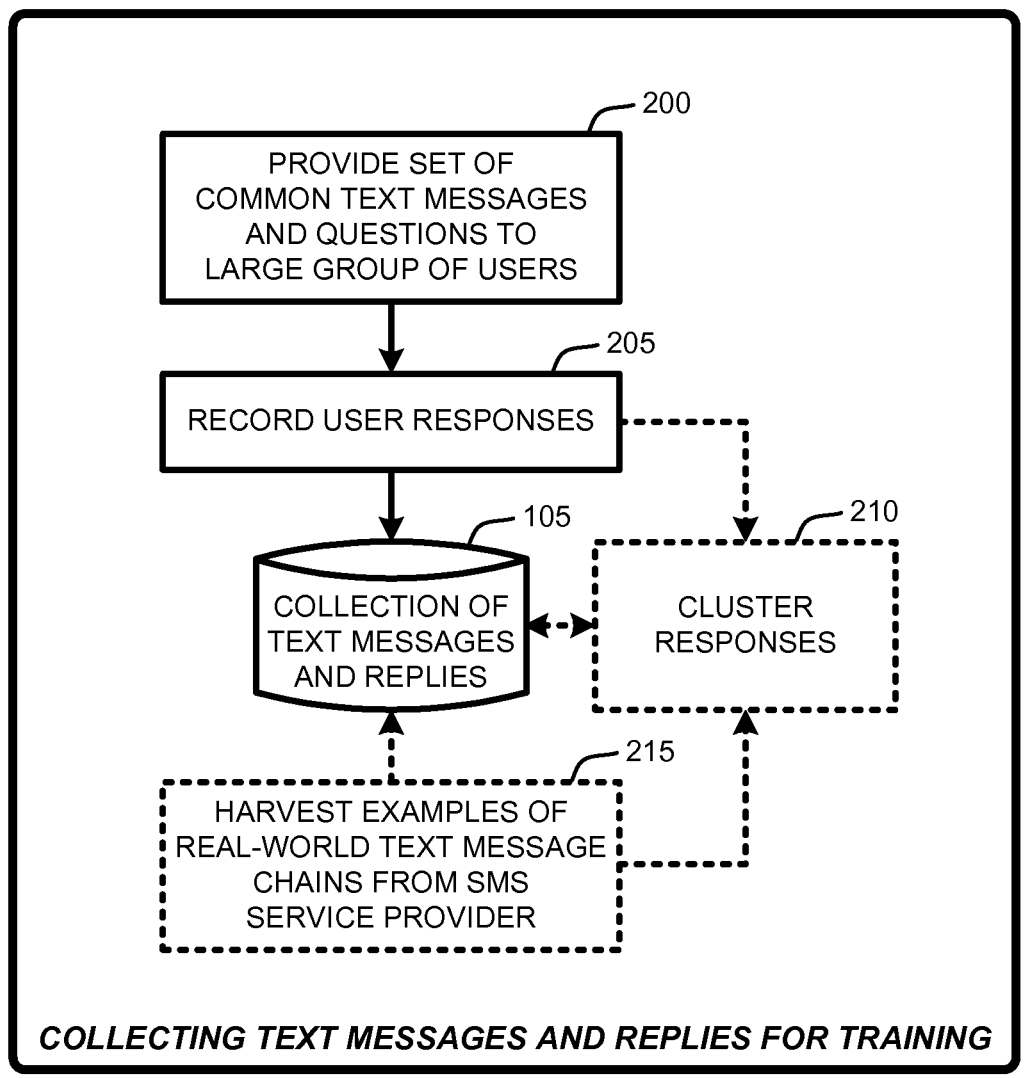
FIG. 2 illustrates a general system flow diagram that illustrates various exemplary methods for generating an initial collection of text messages for training language models and generating a set of text messages for use with the Voice Search Message Service, as described herein.

As summarized in Section 1.1 with respect to FIG. 1, the collection of text messages and replies used for constructing the statistical language model and text message database is derived from a collection of real-world text messages as illustrated by FIG. 2. Note that any boxes and interconnections between boxes that are represented by broken or dashed lines in FIG. 2 represent optional or alternate embodiments of the Voice Search Message Service-based techniques described herein, and that any or all of these optional or alternate embodiments, as described below, may be used in combination with other alternate embodiments that are described throughout this document.

For example, as illustrated by FIG. 2, in one embodiment, a group of users is provided 200 with a set of sample text messages or questions. The users are then asked to provide a separate text message response to each question. These responses are then recorded 205 and used to populate the collection of text messages and replies 105. Further, in various embodiments, user responses to particular sample text messages or questions are clustered 210. For example, given a sufficiently large population of users, it is expected that many of the text messages will be either questions or responses to questions, and that there will be a variety of unique responses (with a number of duplicate or closely matching responses) to each of the sample text messages. This information is used in either of two general types of clustering that are considered in various embodiments of the Voice Search Message Service.

For example, the first type of clustering considers whether a text message is question, such as a message including terms such as "where", "who", "when", "what", "why", "yes/no", "?" etc., so that a question specific language model can be trained in order to achieve higher accuracy when paraphrasing the user speech input to the incoming text message question. Note that in this case, a separate statistical language model is trained on only those text messages identified as questions (i.e., text messages in the collection of text messages and replies 105 that are identified as questions are clustered for use in training a question specific statistical language model). This separate statistical language model is then called whenever it is determined that the user is responding to an incoming text message that is a question type text message.

The second type of clustering identifies semantically similar groups of text messages so that the Voice Search Message Service can avoid identifying redundant text messages as probabilistic matches to the n-best speech recognition hypotheses. For example, if two messages differ only by the terms "OK" and "Okay", these messages will be considered as being semantically similar and will be clustered. Then, only one message from a particular cluster will be selected by when identifying probabilistic matches to any of the n-best speech recognition hypotheses generated from the user speech input. In other words, various statistical classification techniques are used to group or cluster the text messages into "classes." Then, only one reply from each of two or more of these classes are presented to the user as possible matches to the speech recognition hypotheses. Additional examples of semantically similar messages that would be included in a single cluster or class include the following sample text messages:

"I'll be there in 10 minutes"
"Yes, I'll be there in 10 minutes"
"Yeah, I'll be there in 10 minutes"
"Be there in 10 minutes"
etc.

In either case, clustering of responses is used in various embodiments to limit the particular text messages that are returned to the user as potential matches to the user speech input. In particular, the relationship between the sample text messages or questions and the user responses is used in various embodiments to cluster 210 responses based on the sample text messages or questions being asked. Then, when the text message database 120 and statistical language model 115 are constructed or learned from the collection of text messages and replies 105, the clustering information is used to enhance the user experience by using either a question specific language model, or to limit the identification of multiple semantically similar text messages from the same cluster.

In another embodiment, a large set of real-world text message data representing a plurality of unique users is obtained from a short message service (SMS) service provider or other text messaging service. This information is then harvested 215 to populate the collection of text messages and replies 105. Note that in this case, it is expected that personal information such as names, addresses, phone numbers, etc., will stripped from any messages supplied by the SMS service provider or other text messaging service. Therefore, text messages that eventually populate the text message database (see text message database 120 of FIG. 1) will not include personal information of the users that originally sent those messages.

Further, as with recording 205 user responses to the set of sample text messages or questions, responses to text messages that are harvested 215 to populate the collection of text messages and replies 105 can also be clustered 210, as described above.

2.3 Learning the Language Model and Text Message Reply Set

As summarized in Section 1.1 with respect to FIG. 1, the Voice Search Message Service automatically learns the statistical language model based on the collection of text messages and replies that are provided for training (see Section 2.2). The learned probabilistic model is generally trained on a fairly large training set of SMS-type text messages in order to provide a robust language model specific to the text messaging reply space. Note that while the following discussion generally describes the use of an N-gram based language model, any desired type of language model (e.g., unified language models or the like) may be used to implement the Voice Search Message Service described herein. Further, it should also be noted that N-gram language models are generally well known to those skilled in the art, and will not be described in detail herein.

In general, as is well known to those skilled in the art of speech recognition, in simple speech recognition/speech understanding systems, expected input sentences are often modeled using a strict context free grammar (CFG). In this case, the user is only allowed to utter sentences that are explicitly covered by the grammar of the CFG. However, CFGs are generally insufficient to provide robust speech recognition/understanding tasks based in spontaneous speech inputs from the user. Therefore, while conventional CFG's are used in various embodiments of the Voice Search Message Service for purposes of entering specific values via the user speech input (e.g., numbers, dates, times, names, etc.), a more flexible probabilistic language model, such as, for example, an N-gram-based language model, is more suited to the voice-search based techniques described herein.

Conventional N-gram-based language models are traditionally used in large vocabulary speech recognition systems to provide a speech recognizer with an a priori likelihood P(W) of a given word sequence, W. N-gram language models are generally derived from large training texts that share the same language characteristics as the expected speech input. However, in the case of the Voice Search Message Service described herein, the training text is specifically limited to the collection of text messages and replies recorded from user input or harvested from a text message service provider or the like (see Section 2.2 and FIG. 2 for a discussion of populating the collection of text messages and replies 105 used for training of the language model).

2.3.1 Customizing the Text Message Database

As noted above, in various embodiments of the Voice Search Message Service, the user is presented with the capability to customize the text message database, either automatically, or via specific user input. For example, as noted above, in various embodiments, one or more user contact lists are automatically parsed to extract names, email addresses, phone numbers, calendar information (e.g., dates, times, locations, etc.), for use in constructing particular text messages for transmission by the Voice Search Message Service. Typically, this parsed information will be used for slot filling in template type messages. See Section 2.5 for additional discussion regarding slots or variables in text messages.

Similarly, in various embodiments, any text messages received or transmitted by the user (e.g., a user text message store or the like) can also be either added directly to the text message database, or can be provided as a training input (along with the collection of text messages and replies used for training) during the training stage when constructing the statistical language model and text message database, as described above.

Finally, in various embodiments, the user is provided with the capability to create one or more custom text messages for inclusion in the text message database that is matched to the user speech input. In this case, the user will either enter the text message by providing one or more text strings, or by using speech recognition capabilities of the Voice Search Message Service. However, unlike the fuzzy matching used to paraphrase the user speech input for message selection, in the case where the user is providing custom text messages via a speech input, the Voice Search Message Service will ask the user to confirm the specific words of the text message, and will allow the user to make corrections, as needed.

Note that in various embodiments, these types of customization capabilities will be intentionally limited or disabled in the case where it is deemed unsafe for a user to devote the attention required to provide such input. For example, in the case that the user is in a moving car, it will be assumed that the user is driving. Therefore, for safety purposes, the driver will be prevented from interacting with the Voice Search Message Service in any way that would require undue attention. Note that many mobile devices, such as in-car GPS navigation systems currently offer such features, where the user is prevented from entering or selecting GPS destinations while the car is moving.

2.4 Voice Search Guided Speech Recognition

As noted above, the Voice Search Message Service uses a statistical language model (SLM) trained on one or more sets of real-world text messages. This probabilistic model, in combination with the set of text messages constructed for transmission, forms the core of the "fuzzy matching" voice-search based message selection processes described herein.

In general search system processes of the Voice Search Message Service operate by attempting to first recognize the user's speech input using speech recognition algorithms guided by the statistical language model trained on real-world text messages. This is followed by an information retrieval process based on probabilistic techniques such as a vector space model (VSM) to map the speech recognition result (or results) to one or more closest matches from a large number of pre-defined messages in the database. This type of probabilistic matching eliminates any need to correct misrecognized words since the matches are intended to paraphrase the speech of the user rather than exactly match that speech.

In particular, the statistical language model is used in combination with the acoustic model of the speech recognizer to determine a probabilistic hypothesis of what the user said in the user speech input, i.e., P(R|O), where R represents the recognized speech input of the user (i.e., the speech recognition hypothesis returned by the language model in response to the speech input of the user), and where O is the input signal observation (i.e., the captured user speech input).

Together, these two components allow the Voice Search Message Service to compute the most likely text message for transmission, $M=\mathrm{argmax}_M P(M|O)$, by evaluating the expression illustrated by Equation 1, as follows:

$$M = \mathrm{argmax}_M \sum_R P(M \mid R)P(R \mid O)P(R) \quad \text{Equation 1}$$
$$\approx \mathrm{argmax}_M \max_R P(M \mid R)P(R \mid O)P(R)$$

where M is drawn from the text message database (see text message database 120 of FIG. 1) as the message that has the highest probability of match to the user speech input. In particular, the message having the highest probability of match to the user speech input is determined by using the VSM (see additional discussion of the VSM below) to identify a probabilistic match to the speech recognition hypothesis corresponding to the user speech input. Note that in various embodiments where a vector space model is used for information retrieval, a set of messages, $M_i$, is returned by evaluating the expression $M_i=\mathrm{argmin}_M \mathrm{Distance}(M, \mathrm{argmax}_R P(R|O)P(R))$ to return a desired number of probabilistically matching text messages from the text message database, or all text messages having a probability score above some desired match threshold.

Further, as noted above, in various embodiments, a set of several speech recognition hypotheses are returned by the language model, i.e., $R_i=\{R_1, R_2, \ldots R_n\}$, as representing the n-best speech recognition hypotheses to the user speech input. As noted above, the value of n here is limited either by fixing the value of n at some desired value (e.g., three most likely phrases spoken by the user), or by limiting n as a function of a minimum acceptable probability or confidence associated with each of the n-best speech recognition hypotheses.

These n-best speech recognition hypotheses are then used to identify and return a set of probabilistically matching text messages from the text message database (with one or more text messages probabilistically matching each of the n-best speech recognition hypotheses) using information retrieval (IR) techniques, as discussed above. This resulting set of probabilistically matching text messages is then ranked or sorted in an order corresponding to the probability of each returned match (i.e., the matching text messages are sorted in order of the confidence score of the corresponding speech recognition hypotheses. Further, in various embodiments, this ranking is further refined by determining a relevancy score of each of the probable matches (see discussion of the text message ranking and relevancy module 150 with respect to FIG. 1).

2.4.1 Vector Space Model (VSM)

As noted above, the set or one or more speech recognition hypotheses returned by the speech recognizer utilizing the SLM in response to the user speech input are used to select one or more text messages from the text message database. This selection process generally uses information retrieval or content search techniques to identify one or more text messages from the text message database 120 as probabilistic matches to the set of n-best speech recognition hypotheses generated in response to the user speech input. In various embodiments, this information retrieval process uses a vector space model (VSM) to select text messages matching the user speech input.

In general, the VSM operates by pre-processing the text message database to represent each of the text documents (i.e., individual text messages) as vectors of index terms (i.e., individual words in each text messages). Note that the individual "words" in these text messages can also include common texting acronyms such as "TTYL" (i.e., "talk to you later") or emoticons (e.g., "smiley faces" and the like).

More specifically, the VSM is constructed by converting each text message into a vector which, in various embodiments, uses term frequency/inverse document frequency (TF/IDF) weights for terms, where the vector terms consist of word unigrams and/or bigrams from each corresponding text message. The VSM allows the sequence of words in each text message to be compared to the sequence of words represented by the recognized user speech input in a space of vectors. For example, the bigrams that can be constructed from the phrase "meet me later" include: "<s> meet", "meet me", "me later", and "later </s>", where "<s>" and "</s>" represent the start and the end of a sentence. In other words, an N-gram represents all consecutive N terms from each individual text message in the text message database. See the additional discussion of TF/IDF based weighting of terms in Section 2.4.2.

Similarly, the recognized speech of the user speech input is also converted into a vector representation. Since both the text messages and the user speech input then exist in the same vector space, the VSM allows the Voice Search Message Service to probabilistically map each speech recognition result (i.e., each of the n-best speech recognition hypotheses) to one or more closest matches to text messages in the text message database.

2.4.2 Relevancy Rankings

As noted above, in various embodiments, the Voice Search Message Service computes a "relevancy ranking" or score for one or more probabilistic matches from the text message database constructed during initial training. The Voice Search Message Service uses the VSM for this purpose. In particular, in various embodiments, when determining the relevancy of matched text messages, the relevancy is calculated as the cosine of the angle between vectors, as illustrated by Equation 2, where:

$$\cos(\theta) = \frac{v_1 \cdot v_2}{\|v_1\|\|v_2\|} \quad \text{Equation 2}$$

where, $v_1$ represents the user speech input, as recognized with or without errors, and $v_2$ represents a text message from the text message database of messages for transmission.

Further, as noted above, in various related embodiments, one or more words or word strings in the text message database are weighted using techniques such as term frequency/inverse document frequency (TF/IDF) based techniques to increase or decrease the relevancy of particular text messages when searching for probabilistic matches to the user speech input.

In particular, term frequency (TF) is used to weight terms based on the frequency of occurrence of those terms in specific text messages. For example with TF, if a particular term repeats two or more times in a particular text message, then that term will be considered as more important and will be weighted to increase the relevancy of a match to a corresponding user speech input (as recognized with or without errors) that includes that same term. Conversely, inverse document frequency (IDF) is used to weight terms based on the frequency of appearance of those terms across all text messages in the text message database. For example, if a term occurs more frequently within the overall collection of text messages in the text message database, it is considered less important, and the weighting will be used to reduce the relevancy of text messages including that term relative to the recognized speech of a user input. By using the combination of TF and IDF (i.e., TF/IDF) to weight particular terms, the relevancy of matches is improved.

Similarly, in related embodiments, synonyms (e.g., "yeah", "yes", "sure", "ya", "yea", "OK", etc.) are also considered in determining relevancy of a particular match in terms between the user speech input and text messages in the text message database. In this case, weighting based "soft matches" of synonyms in the recognized user speech input and one or more of the text messages in the text message database will be used to increase the relevancy of particular text messages to the user speech input.

2.5 Text Messages with Variables or Slots

As noted above, text messages can have slots or variables to make those text messages more flexible. For example, an existing text message may read: "I'll be there in 10 minutes". However, this user may want to send a text message: "I'll be there in 25 minutes." Therefore, rather than provide a text separate message with every possible time, generic messages are constructed as "templates" with slots or variables that are automatically filled based on speech recognition for populating the empty slot or variable of the template.

For example, in a tested embodiment, text messages in the text message database were text normalized to mark time and number concepts for generalization. In other words, both "at five o'clock", "at two thirty P. M." are mapped into the same message template "at <time>" where <time> represents any time concept and is recognized using conventional "context free grammar" (CFG) speech decoder techniques for recognizing time concepts. Similar techniques are provided in various embodiments for other slot types, such as, for example, numbers (e.g., telephone numbers, specific number of minutes or hours, etc.), personal names (which can also be automatically harvested from the user's contact database of message store, or from incoming text messages), places or points of interest (e.g. restaurants, parks, banks, etc.), dates, appointments, traffic reports or driving directions (obtained from online sources such as GPS- or Internet-based services), etc.

2.6 Additional Embodiments and Considerations

The following paragraphs describe various additional embodiments of the Voice Search Message Service that are enabled in view of the discussions provided herein.

2.6.1 Concatenating Multiple Text Messages to Match Speech Input

As discussed in Section 2.4, the N-gram based language model used by the Voice Search Message Service generally compares combinations of N words of the recognized user speech input to similar combinations of N words from text messages in the text message database. However, it is possible that the collection of text messages in the text message database will not provide good coverage of any of the speech recognition hypotheses returned in response to the user speech input in the case that the user speech input is more complicated than the existing text messages in the text message database. In fact, it is possible that different N-grams from the recognized user speech input will closely match different text messages. In such cases, it is often appropriate to concatenate two or more of the text messages to more accurately paraphrase the user speech input.

Therefore, in various embodiments, the Voice Search Message Service dynamically concatenates two or more text messages from the text message database to automatically construct a longer text message for transmission. In the case that the resulting longer text message provides a higher probability of match (and/or a higher relevancy score), the Voice Search Message Service will select the longer message, constructed by concatenating shorter messages, for transmission.

For example, assume that the text message database includes the text messages: "I'm hungry" and "let's get lunch at <time>" (where this second text message is a template type message including the variable <time>). Further, assume that the user speech input is "I'm starving, meet me for lunch at 12:30". In this case, a "soft match" (based on synonyms "hungry" and "starving") of the 2-gram "I'm starving" to the 2-gram "I'm hungry" from the text message database will return the text message "I'm hungry" as a relevant text message corresponding to the user speech input. Similarly, an N-gram comparison of the user speech input "meet me for lunch at 12:30" will return the text message "let's get lunch at 12:30", where the <time> variable of the text message is populated based on a context free grammar (CFG) speech recognition of the time "12:30" as spoken by the user. Therefore, the Voice Search Message Service will dynamically concatenate the two text messages to form the composite text message: "I'm hungry, let's get lunch at 12:30." In this case, the concatenated text message will have a higher probability of match to user speech input than any of the individual text messages in the text message database. Therefore, this dynamically concatenated text message will be selected and transmitted to one or more intended recipients.

Clearly, while the composite text message in the preceding example does not accurately reflect an exact translation of the user speech input, it does acceptably paraphrase the user speech input in a manner sufficient for text messaging purposes. Further, it should also be noted that little or no user input beyond simply speaking the input "I'm starving. Meet me for lunch at 12:30" is required to generate the composite text message of "I'm hungry, let's get lunch at 12:30."

2.6.2 Voice Calls in Response to Incoming Text Message

As noted above, in various embodiments, the user is presented with one or more choices of relevant matches from the text message database to the user speech input. However, it is possible that none of the presented matches are acceptable to the user. Further, it is also sometimes the case that text messages simply can't convey the intent of the user in a manner that is as clear as a direct voice communication. Therefore, in various embodiments, the Voice Search Message Service includes the capability for the user to initiate voice communications either to a desired contact, or in direct response to an incoming text message. In either case, the actual voice communications use conventional voice communications techniques (e.g., cell phone or other wired or wireless communications device).

2.6.3 Attach Recording of User Speech Input to SMS Message

As noted above, text messages selected for transmission in response to the user speech input are intended to generally paraphrase the user speech input rather than to exactly and translate the speech input to a text message. Therefore, to reduce the possibility of error in the text message transmitted in response to the user speech input, in various embodiments, a voice recording of the user speech input is saved and automatically transmitted as an attachment to the text message. The user receiving the text message can then choose to listen to the attached recording, if desired.

2.6.4 Use of Question Dependent Language Models

As noted above, the Voice Search Message Service generally returns a text message that is intended to paraphrase the user speech input rather than exactly reproduce that speech input in a text message. However, while particular matches may be statistical more relevant than other messages, other cues drawn from either the user speech input, or from an incoming text message to which the user is replying may indicate that a statistically less relevant text message is actually a more accurate match to the user speech input. In particular, in the case that the user is either asking a question via the user speech input, or responding to a question in the incoming text message, the fact that a question is involved is used to further guide selection of the text message in response to the user speech input.

More specifically, as noted above, in various embodiments, question type messages are clustered into a special group that is used for training a question-specific statistical language model. Then, when the user is either responding to a question in an incoming text message, or asking a question via the user speech input, the question-specific statistical language model will be used to generate each of the speech recognition hypotheses corresponding to the user speech input. In other words, in various embodiments, the Voice Search Message Service provides a question dependent speech recognition process.

Identification of user speech as a question can be accomplished in several ways. For example, assuming spoken U.S. English, the pitch of the user voice generally rises at the end of a sentence to indicate that the user is asking a question. Further, particular words (recognized using a strict context free grammar (CFG) language model) such as "when", "where", "what", etc., can also be used to indicate that the user is asking a question.

Therefore, in the case that the user speech in determined to represent a question, the search through the vector space of potentially matching text messages in the text message database is more likely to select relevant text messages since the statistical language model used in this case has been trained on text messages flagged as questions. Similarly, in the case that the user is responding to an incoming text message that is identified as a question, the search through the vector space of potentially matching text messages is more likely to select relevant text messages since the statistical language model used in this case has been trained on text messages flagged as questions. Note that incoming text messages can be identified as questions through the use of particular words (e.g., "when", "where", "what", etc.), through a semantic analysis of the structure of the incoming text message, or through the use of a question mark (i.e., "?") in the incoming text message.

2.6.5 Use of "Emoticons" in Text Messages

As is well known to those skilled in the art, text messages often include "emoticons", e.g., small embedded images such as "smiley faces" and the like, or character sequences used to represent similar ideas, e.g., the characters ":-)" to represent a smiley face. The text messages in the text message database may include these types of images or characters simply by virtue of the fact that those messages were harvested from a set of real-world or user customized messages. Therefore, the text messages probabilistically matching a user speech input may inherently include emoticons or the like.

Further, in various embodiments, the user is provided with the capability to insert emoticons into existing text messages via the user speech input. In this case, a context free grammar (CFG) language model is used to identify specific emoticons for inclusion in the text message. For example, in various embodiments, the user can speak a phrase, such as, for example, "insert smiley face", "sad face icon", or the like, to direct the Voice Search Message Service to insert a corresponding emoticon into the text message to be transmitted.

2.6.6 Speech-to-Speech Translation

As noted above, in various embodiments, conventional text-to-speech techniques are used to generate a speech output from text messages that are presented to the user for selection via the user confirmation module. Therefore, in various embodiments, these same capabilities are used to produce a phrasebook or the like for speech-to-speech translation services For example, as described above, the Voice Search Message Service generally provides various techniques for using arbitrary speech inputs to automatically select and transmit a text message from a database of pre-defined text message such that the selected text message generally paraphrases the user speech input. Therefore, if instead of transmitting the selected message, that message is simply converted to a speech output for local playback, the result is that the user can speak an arbitrary phrase as an input, and the Voice Search Message Service will automatically provide a speech output that paraphrases the arbitrary speech input. Clearly, such capabilities can be used for a number of purposes, including phrasebook type speech-to-speech translations, depending upon the data sets used for training the statistical language model.

3.0 Operational Summary of the Voice Search Message Service

Figure 3:
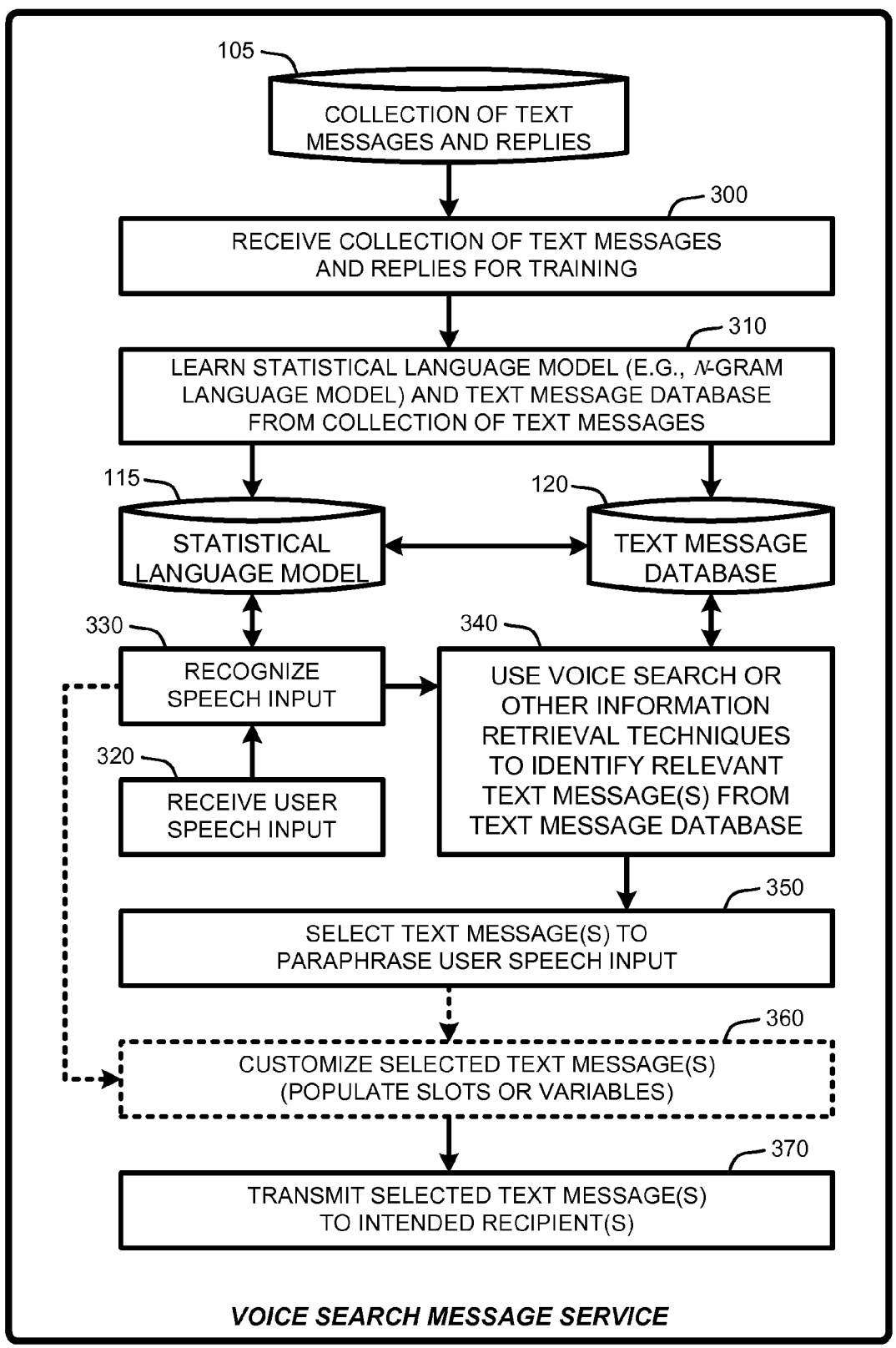
FIG. 3 illustrates a general system flow diagram that illustrates exemplary methods for implementing various embodiments of the Voice Search Message Service, as described herein.

The processes described above with respect to FIG. 1 and FIG. 2, in further view of the detailed description provided above in Sections 1 and 2 are illustrated by the general operational flow diagram of FIG. 3. In particular, FIG. 3 provides an exemplary operational flow diagram that summarizes the operation of some of the various embodiments of the Voice Search Message Service-based techniques described above. Note that FIG. 3 is not intended to be an exhaustive representation of all of the various embodiments of the Voice Search Message Service-based techniques described herein, and that the embodiments represented in FIG. 3 are provided only for purposes of explanation.

Further, it should be noted that any boxes and interconnections between boxes that are represented by broken or dashed lines in FIG. 3 represent optional or alternate embodiments of the Voice Search Message Service-based techniques described herein, and that any or all of these optional or alternate embodiments, as described below, may be used in combination with other alternate embodiments that are described throughout this document.

In general, as illustrated by FIG. 3, the Voice Search Message Service begins operation by receiving 300 a collection of text messages and replies 105 for training. As discussed in detail in Section 2.3, the Voice Search Message Service then uses the collection of text messages and replies 105 to automatically learn 310 the statistical language model 115, such as, for example, an N-gram language model. In addition, also as discussed above in Section 2.3, the Voice Search Message Service also constructs the text message database 120 from the collection of text messages and replies 105. Then, given the learned statistical language model 115 and the text message database 120, the Voice Search Message Service is ready to recognize user speech inputs and select text messages for transmission.

In particular, once the statistical language model 115 and the text message database 120 have been created, the Voice Search Message Service receives 320 a user speech input. The Voice Search Message Service then recognizes 330 the speech input relative to the learned statistical language model 115 and the lexicon of words or terms defined by the contents of the text messages in the text message database 120.

Once the user speech input has been recognized 330, either a single speech recognition hypothesis, or as a set of n-best probabilistic speech recognition hypotheses, the Voice Search Message Service uses the recognized speech to identify one or more probabilistic matches from the text message database 120. In other words, the Voice Search Message Service uses voice search 340 techniques to identify a set of one or more relevant messages from the text message database 120, as described in detail in Section 2.4.

Once the Voice Search Message Service has identified the set of relevant text messages from the text message database 120, the Voice Search Message Service then evaluates those messages and selects 350 a single message to paraphrase the user speech input. In various embodiments, if the selected message is a template type message, the selected message is then customized 360 by populating any slots or variables in the message based on a CFG analysis of the user speech input. See Section 2.5 for a detailed discussion of template type text messages and population of the slots or variables in those messages. In either case, whether or not the text message was a template type message, the selected text message is transmitted 370 to one or more intended recipients.

4.0 Exemplary Operating Environments

Figure 4:
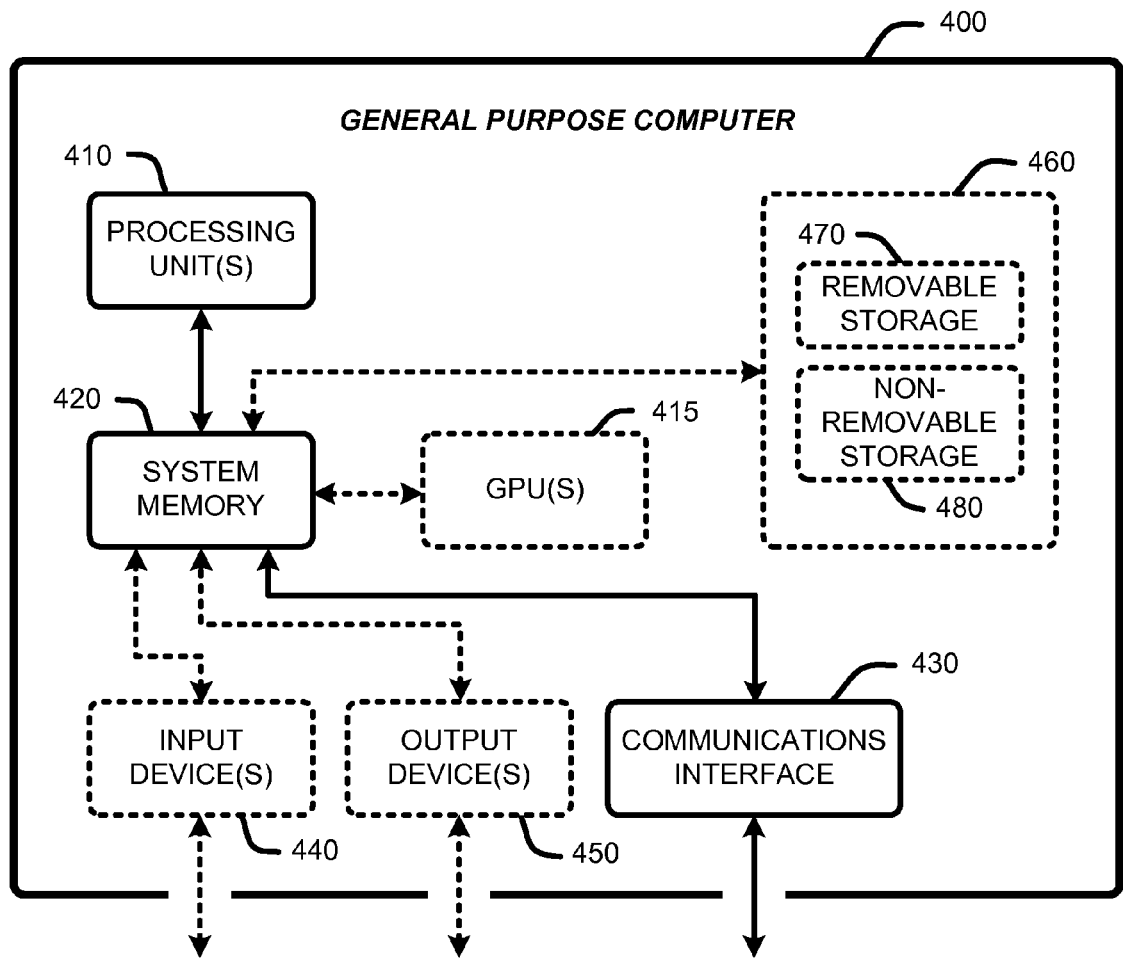
FIG. 4 is a general system diagram depicting a simplified general-purpose computing device having simplified computing and I/O capabilities for use in implementing various embodiments of the Voice Search Message Service, as described herein.

The Voice Search Message Service-based techniques described herein are operational within numerous types of general purpose or special purpose computing system environments or configurations. FIG. 4 illustrates a simplified example of a general-purpose computer system on which various embodiments and elements of the Voice Search Message Service, as described herein, may be implemented. It should be noted that any boxes that are represented by broken or dashed lines in FIG. 4 represent alternate embodiments of the simplified computing device, and that any or all of these alternate embodiments, as described below, may be used in combination with other alternate embodiments that are described throughout this document.

For example, FIG. 4 shows a general system diagram showing a simplified computing device. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, mini-computers, mainframe computers, video media players, in-vehicle computing systems (e.g., automotive computer system), etc.

At a minimum, to allow a device to implement the Voice Search Message Service, the device should have some minimum computational capability along with some way to receive voice inputs and transmit text messages. In particular, as illustrated by FIG. 4, the computational capability is generally illustrated by one or more processing unit(s) 410, and may also include one or more GPUs 415. Note that that the processing unit(s) 410 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 4 may also include other components, such as, for example, a communications interface 430. The simplified computing device of FIG. 4 may also include one or more conventional computer input devices 440 (such as a microphone or microphone array for receiving voice inputs). The simplified computing device of FIG. 4 may also include other optional components, such as, for example one or more conventional computer output devices 450 (such as audio and/or video output devices). Finally, the simplified computing device of FIG. 4 may also include storage 460 that is either removable 470 and/or non-removable 480. Note that typical communications interfaces 430, input devices 440, output devices 450, and storage devices 460 for general-purpose computers are well known to those skilled in the art, and will not be described in detail herein.

The foregoing description of the Voice Search Message Service has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the Voice Search Message Service. It is intended that the scope of the invention be limited not by this detailed description, but rather by the claims appended hereto.

What is claimed is:

1. A method for automatically generating a text message from an arbitrary speech input, comprising steps for:
   receiving a statistical language model trained using one or more sets of real-world text messages as training input;
   receiving a text message database constructed using a subset including some or all of the text messages in the one or more sets of real-world text messages received as the training input;
   receiving an arbitrary user speech input;
   evaluating the speech input relative to the probabilistic model and text message database to return a set of one or more probable speech recognition hypotheses corresponding to the arbitrary user speech input;

identifying a set of one or more text messages from the text message database as probabilistic matches to one or more of the speech recognition hypotheses;

ranking the probabilistically matching text messages in an order corresponding to a probabilistic confidence score associated with each speech recognition hypothesis;

selecting the highest ranked text message to paraphrase the arbitrary user speech input; and transmitting the single selected text message to one or more recipients.

2. The method of claim 1 further comprising computing a relevancy score for each probabilistically matching text message, said relevancy score providing a probabilistic measure of how well each of the probabilistically matching text messages match a corresponding one of the speech recognition hypotheses.

3. The method of claim 2 wherein the ranked probabilistically matching text messages are re-ranked in order of highest relevancy score to lowest relevancy score prior to selecting the highest ranked text message.

4. The method of claim 2 wherein the relevancy score is computed as a function of a vector space mode (VSM), by performing steps comprising:

representing each of text message in the text message database a vector of index terms, each index term representing one word of the corresponding text message;

representing each speech recognition hypothesis as a vector of index terms, each index term representing one word in the corresponding speech recognition hypothesis;

for each probabilistically matching text message, computing the relevancy score as a cosine of the angle between the vector corresponding to that text message and the vector of the corresponding speech recognition hypothesis.

5. The method of claim 1 wherein one or more of the text messages in the text message database includes one or more variables, and wherein one or more of the variables of any text message selected for transmission are populated by using a context free grammar model to identify specific words to populate those variables from the arbitrary user speech input.

6. The method of claim 1 wherein one or more of the text messages in the text message database includes one or more variables, and wherein one or more of the variables of any text message selected for transmission are populated by automatically harvesting corresponding information from one or more locally available sources, including user contact lists, user message stores, and user calendars.

7. The method of claim 1 wherein one or more of the sets of real-world text messages are generated by recording text message responses of a set of users to a pre-defined set of text messages.

8. The method of claim 1 wherein one or more of the sets of real-world text messages are generated by harvesting a set of text messages from a text message service provider.

9. The method of claim 1 wherein one or more of the ranked text messages are presented to the user for selection of the text message for transmission rather than automatically selecting the highest ranked text message to paraphrase the arbitrary user speech input.

10. The method of claim 1 wherein the text messages in the text message database are clustered into classes, and wherein no more than one text message is selected from each class when identifying the set of text messages as probabilistic matches to the speech recognition hypotheses.

11. The method of claim 1 further comprising personalizing the text message database for a particular user by including text messages previously sent by the user in the text message database.

12. The method of claim 1 wherein text-to-speech processing techniques are used to convert the selected text message to a speech output for local playback instead of transmitting the selected text message to one or more recipients.

13. The method of claim 1 wherein the statistical language model includes a question dependent grammar model with corresponding question dependent replies in the text message database.

14. A system for selecting a text message for paraphrasing an arbitrary speech input, comprising:

a device for training one or more probabilistic language models from one or more sets of text messages;

a device for constructing a text message database from the one or more sets of text messages;

a device for receiving an arbitrary speech input;

a device for generating one or more speech recognition hypotheses by applying the statistical language model to the arbitrary speech input;

a device for identifying a group of one or more text messages in the text message database that probabilistically match each of the speech recognition hypotheses;

a device for selecting a single message from the group of one or more text messages, said selected text message paraphrasing the arbitrary speech input; and a device for automatically transmitting the selected text message to one or more intended recipients.

15. The system of claim 14 further comprising a device for ranking the probabilistically matching text messages in order of highest probability to lowest probability, and wherein the highest ranked text message is the single text message that is selected from the group of one or more text messages.

16. The system of claim 14 further comprising a device for:

re-ranking the probabilistically matching text messages prior to message selection by computing a relevancy score for each of the probabilistically matching text messages, and ranking the probabilistically matching text messages in order of highest relevancy to lowest relevancy; and wherein the relevancy score for each of the probabilistically matching text messages is computed based on a vector space comparison of each probabilistically matching text message to the corresponding speech recognition hypothesis.

17. A computer-readable medium, which does not consist of a modulated data signal or carrier wave, having computer executable instructions stored therein for generating a text message based on an arbitrary speech input, said instructions comprising:

training a statistical language model and a corresponding text message database directly from one or more sets of real-world text messages, said language model including a lexicon limited to terms extracted from the one or more sets of real-world text messages;

receiving an arbitrary speech input from a user;

applying the statistical language model and lexicon to the arbitrary speech input to generate one or more probabilistic speech recognition hypotheses without requiring any user input to correct potential speech recognition errors;

for each speech recognition hypothesis, identifying a group of one or more probabilistically matching text messages from the text message database, each probabilistically matching text message including a probability of match;

ranking the probabilistically matching text messages based on the corresponding probability of match;

evaluating the ranking of the text messages to select a single ranked text message to paraphrase the arbitrary speech input; and transmitting the selected text message to a recipient.

18. The computer-readable medium of claim 17 wherein one or more of the text messages in the text message database includes one or more variables, and wherein one or more of the variables of any text message selected for transmission are populated by using a context free grammar model to identify specific words to populate those variables from the arbitrary speech input.

19. The computer-readable medium of claim 17 further comprising instructions for presenting one or more of the ranked text message to the user for selection of the single text message for transmission.

20. The computer-readable medium of claim 17 further comprising instructions for automatically concatenating two or more text messages from the text message database to construct one or more new text messages for inclusion in the group of one or more probabilistically matching text messages.

* * * * *